No. 837,515. PATENTED DEC. 4, 1906.
W. C. STEPHENS.
GUIDE FOR ROCK DRILLS.
APPLICATION FILED FEB. 12, 1906.
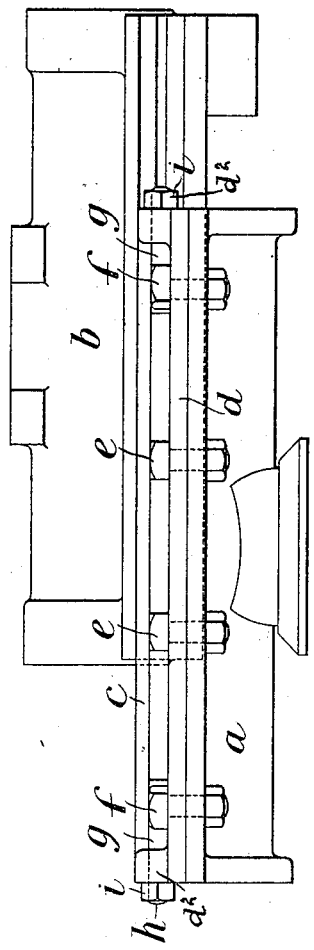
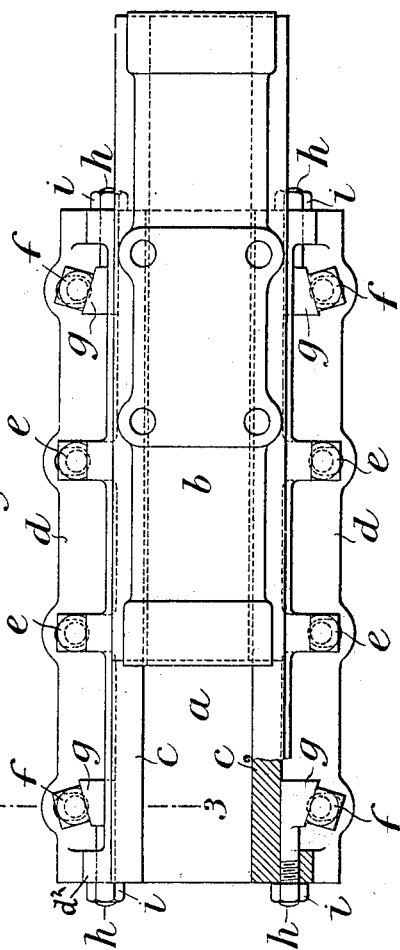
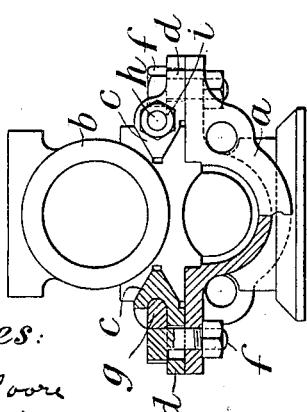
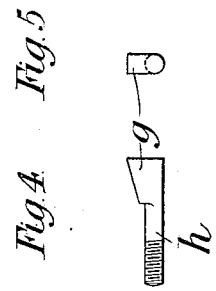
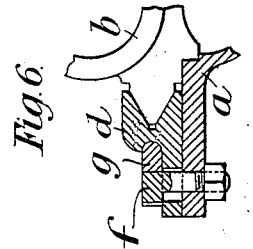
Witnesses:
J. K. Moore
T. H. Hubbard
Inventor:
William C. Stephens
by
Whitaker Prindle
attys.

UNITED STATES PATENT OFFICE.

WILLIAM CHARLES STEPHENS, OF CARN BREA, ENGLAND.

GUIDE FOR ROCK-DRILLS.

No. 837,515.　　　Specification of Letters Patent.　　　Patented Dec. 4, 1906.

Application filed February 12, 1906. Serial No. 300,738.

*To all whom it may concern:*

Be it known that I, WILLIAM CHARLES STEPHENS, a subject of the King of Great Britain, residing at Climax Rock Drill Works, Carn Brea, Cornwall, England, have invented new and useful Improvements in Guides for Rock-Drills, of which the following is a specification.

My invention relates to guides or slides chiefly applicable to the shells or cradles of rock-drills, but also applicable for use in connection with other tools or machines.

The method heretofore generally adopted for adjusting the cradle-slides of rock-drills necessitated the removal of the top slides from the cradle and the application or the removal of loose liners according to the construction of the shell or cradle, which operation occupied considerable time and usually necessitated the removal of the drill from its support.

The object of my invention is to provide for the adjustment of the guides or slides without necessitating the removal of any bolts or the introduction or removal of liners, the arrangement being such that the adjustment can be readily made while the drill or machine is in actual work.

According to my invention I provide on the cradle bars having V-shaped edges, which enter corresponding grooves on the cylinder or part to be supported, as shown in Fig. 3, or provided with V-shaped grooves which receive corresponding V-shaped ribs on the cylinder or the like, as shown in Fig. 6. These bars are mounted upon plain surfaces on the cradle and are adapted to be secured thereto by a series of bolts, the holes in the bars through which the bolts pass being elongated to permit of the lateral adjustment of the said bars toward or away from each other.

Between the end bolts of each bar or lug on the cradle and the bar itself I introduce wedges having screw-threaded shanks, which project beyond the ends of the bar where they are provided with nuts, the said wedges being so arranged that as they are tightened up they will cause the inward movement of the bars.

To enable my invention to be fully understood, I will describe the same by reference to the accompanying drawings, which illustrate the invention as applied to a rock-drill.

Figure 1 is a side elevation of the cradle of a rock-drill having the cylinder mounted therein according to my invention, and Fig. 2 a plan of the same. Fig. 3 is an end view, partly in section, on the line 3 3, Fig. 2. Figs. 4 and 5 are views of details, and Fig. 6 is a view illustrating a modification.

$a$ is the cradle, and $b$ is the cylinder sliding thereon, $c\ c$ being V-shaped guides upon the cradle, which enter corresponding V-shaped grooves upon the cylinder, as clearly shown in Fig. 3.

The guides $c\ c$ are formed upon bars $d\ d$, which are carried upon the top of the cradle and fixed thereto by means of clamping-bolts $e\ e\ f\ f$, which pass through transverse slots $d'\ d'$ therein, whereby lateral adjustment of the said bars relatively with the bolts is permitted when said clamping-bolts are loosened.

Between the bolts $f\ f$ and the bars $d\ d$ are the wedges $g\ g$, each of which is provided with a shank $h$, extending through an enlargement $d^2$ of one of said bars $d$, as shown in Figs. 4 and 5, and carries a nut $i$, so that when the nut is tightened against said enlargement $d^2$ the wedge by acting against the adjacent bolt $f$ will tend to force the guide $c$ on the bar into the groove of the cylinder.

It will be understood that the arrangement of the wedges is such that when adjusted they form locks to prevent the guide-bars from creeping back.

By the use of V-shaped guides as hereinbefore described the adjustment may be effected horizontally; but during adjustment the nuts of the bolts $ef$ must be slackened sufficiently to allow of the movement of the bars $d$, and when the adjustment has been effected they must be again tightened.

Instead of making grooves in the cylinder and V-shaped ribs on the bars $d$ the arrangement may be reversed—that is to say, the ribs may be upon the cylinder and the groove in the bars $d\ d$, as shown in Fig. 6. Also instead of making both bars adjustable I may in some cases make only one bar adjustable, the other bar being permanently fixed relatively with the cradle or the like.

Having now particularly described and ascertained the nature of my said invention and in what manner the same is to be performed, I declare that what I claim is—

1. In a device of the kind described, the combination with a cradle, of guide-bars movably mounted thereon, said guide-bars being provided with a plurality of transverse slots, a plurality of clamping-bolts secured to said cradle and passing through said slots in said bars and wedges interposed between portions of said guide-bars and certain of said clamping-bolts, substantially as described.

2. In a device of the kind described, the combination with a cradle, of guide-bars movably mounted thereon, said guide-bars being provided with a plurality of transverse slots, a plurality of clamping-bolts secured to said cradle and passing through said slots in said bars, wedges interposed between portions of said bars and certain of said clamping-bolts and means for actuating and locking said wedges, substantially as described.

3. In a device of the kind described, the combination with a cradle, of guide-bars movably mounted thereon, said guide-bars being provided with a plurality of transverse slots, a plurality of clamping-bolts secured to said cradle and passing through said slots in said bars, wedges interposed between portions of said bars and certain of said clamping-bolts, said wedges being provided with threaded shanks passing through orifices in the ends of said guide-bars and nuts on said threaded shanks of said wedges adapted to bear against the ends of said bars whereby said wedges may be moved longitudinally, substantially as described.

4. In a device of the kind described, the combination with a cradle, of guide-bars movably mounted thereon and provided with a plurality of transverse slots, a cylinder adapted to slide on said guide-bars, said guide-bars being provided with V-shaped edges adapted to engage correspondingly-shaped portions of said cylinder, a plurality of clamping-bolts secured to said cradle and passing through said slots in said guide-bars, and wedges interposed between portions of said guide-bars and certain of said clamping-bolts, substantially as described.

5. In a device of the kind described, the combination with a cradle, of guide-bars movably mounted thereon and provided with a plurality of transverse slots, a cylinder adapted to slide on said guide-bars, said guide-bars being provided with V-shaped edges adapted to engage correspondingly-shaped portions of said cylinder, a plurality of clamping-bolts secured to said cradle and passing through said slots in said guide-bars, wedges interposed between portions of said guide-bars and certain of said bolts, said wedges being provided with threaded shanks passing through orifices in the ends of said guide-bars and nuts on said threaded shanks of said wedges adapted to bear against the ends of said bars whereby said wedges may be moved longitudinally, substantially as described.

WILLIAM CHARLES STEPHENS.

Witnesses:
JOHN E. BOUSFIELD,
A. ALBUTT.